(12) United States Patent
Knapp

(10) Patent No.: US 6,956,668 B2
(45) Date of Patent: Oct. 18, 2005

(54) PRODUCTION OF HIGH FIDELITY COPIES BY CONSIDERATION OF A RECEIVER'S CHARACTERISTICS

(75) Inventor: Thomas R. Knapp, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 43 days.

(21) Appl. No.: 09/401,576

(22) Filed: Sep. 22, 1999

(65) Prior Publication Data

US 2003/0197875 A1 Oct. 23, 2003

(51) Int. Cl.⁷ ............................. G06F 3/12; G06F 13/00
(52) U.S. Cl. ........................ 358/1.9; 358/2.1; 358/512
(58) Field of Search ................................ 358/1.9, 1.15, 358/1.16, 1.13, 1.18, 501, 504, 526, 1.12, 2.1, 512

(56) References Cited

U.S. PATENT DOCUMENTS

| | | | | |
|---|---|---|---|---|
| 6,241,339 B1 | * | 6/2001 | Kondo | 347/43 |
| 6,351,320 B1 | * | 2/2002 | Shin | 358/1.9 |
| 6,414,756 B1 | * | 7/2002 | Tsukada | 358/1.9 |
| 6,434,343 B1 | * | 8/2002 | Kobayashi et al. | 399/8 |
| 6,563,945 B2 | * | 5/2003 | Holm | 382/162 |

* cited by examiner

*Primary Examiner*—Douglas Tran

(57) ABSTRACT

A method of copying a document onto a receiver such as paper includes taking the characteristics of the receiver into account in selecting pigments for making the copy. The characteristics may be determined by scanning the receiver to determine its color, finish, texture, etc. If the characteristics are other than a given standard such as white, the pigments necessary to render the receiver area(s) white are determined. Concurrently, the pigments needed for copying the document onto the receiver are also determined. An image processor then generates copy pigment data from the receiver and document pigments and transmits the data to a print engine in the form of toner data. If the copy pigment data might produce too dark a copy, the data is modified uniformly to reduce pigment percentages.

5 Claims, 3 Drawing Sheets

PRODUCTION OF HIGH FIDELITY COPIES BY CONSIDERATION OF A RECEIVER'S CHARACTERISTICS

FIELD OF THE INVENTION

This invention relates generally to electronic copying or printing of documents. More particularly, it relates to a method of producing high fidelity copies by considering the characteristics of the receiver.

BACKGROUND AND SUMMARY OF THE INVENTION

Copiers, printers, and other devices that produce copies of documents operate with the assumption that the receiver of the document image (such as paper, card stock, etc.) is of a given standard, such as material with a white color and certain texture and finish or a transparent material. This, however, is not always true. For example, paper for printing or copying comes in a variety of colors, textures, and finishes. Card stock, which is much thicker than most paper and often of different colors, is also commonly used for copying and printing. The variations in a receiver's actual characteristics from typical characteristics affect the colors perceived in the copy. For example, the color blue may be produced on a white sheet of paper by depositing on the paper a proper mix of subtractive toners (cyan, magenta, and yellow). But depositing the same mix of toners on a red sheet of paper will produce a color other than blue. Yet conventional copiers and printers do not take into account the receiver's colors or other characteristics when determining the mix of toners for printing the copy of a document. The fidelity of a copy may thus be less than what it would have been if the receiver's characteristics were more fully considered.

An objective of the invention, therefore, is to provide a method and system for considering the characteristics of a receiver in producing a copy of a document, whether with a copier, printer, or other imaging device. By taking into account the receiver's characteristics, the toners deposited on a receiver may be adjusted so that the printed colors better match the intended colors.

Additional features and advantages of the invention will be made apparent from the following detailed description of an illustrative embodiment that proceeds with reference to the accompanying drawings.

DETAILED DESCRIPTION OF THE INVENTION

Figure 1:
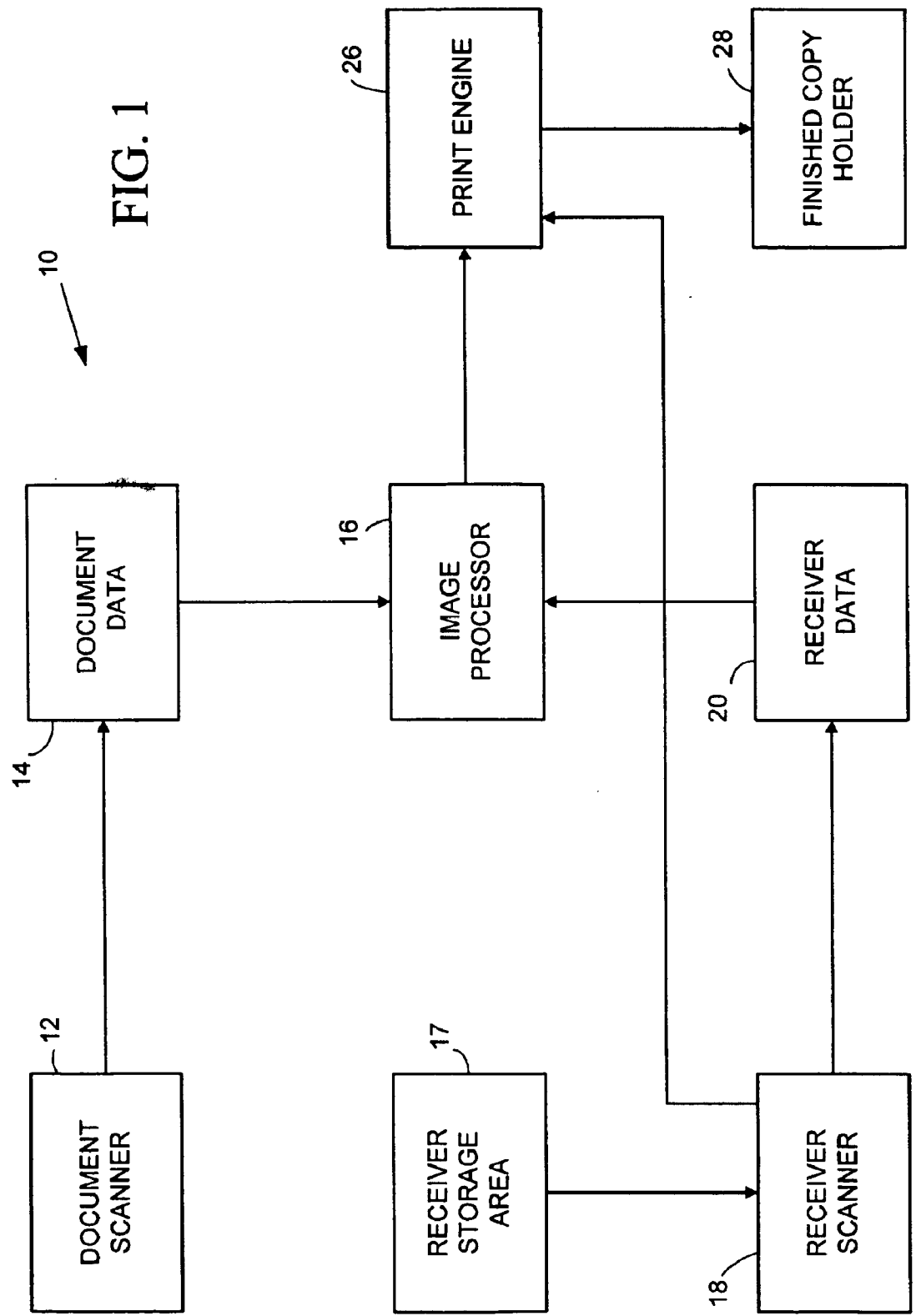
FIG. 1 is a block diagram of a document copying system in accordance with the invention.

FIG. 1 is a block diagram of a document copying system 10 embodying the invention. The term "document" is to be interpreted broadly to include not only physical objects such as papers, but also computer-generated files that contain text and/or graphics. Similarly, the term "copying" is to be interpreted broadly to include the printing of a computer-generated file. Thus while the system 10 in its entirety is capable of copying physical objects, its core may be used separately to print computer-generated files or files generated by any other method such as photography.

Beginning at the left of the figure, a document scanner 12 of conventional design scans documents and generates therefrom digital document data representing the scanned document. Each document pixel is represented by a number of bits such as twenty-four that encode the color of the pixel. This data is saved in a buffer 14 where it is processed by a software routine executed by image processor 16, as will be described. Receiver data comes, in turn, from a receiver such as paper that is initially stored in a feeder 17 such as a paper hopper. When a sheet of paper is required for copying a document, the system 10 pulls the sheet from the feeder 17 and through a receiver scanner 18 of conventional design. The scanner 18, as the scanner 12, scans its contents and generates therefrom digital data representative of the contents. In the case of scanner 18 (or other sensor appropriate to the information being collected), the scanning reveals the characteristics of the receiver such as its color, finish, texture, etc., that might affect the colors of a document printed thereon. Each receiver pixel is represented by a number of bits such as twenty-four that encode the characteristics of the pixel, such as color. The receiver data is saved in a buffer 20 where it is processed by a software routine executed by the image processor 16, as will be described.

Figure 2:
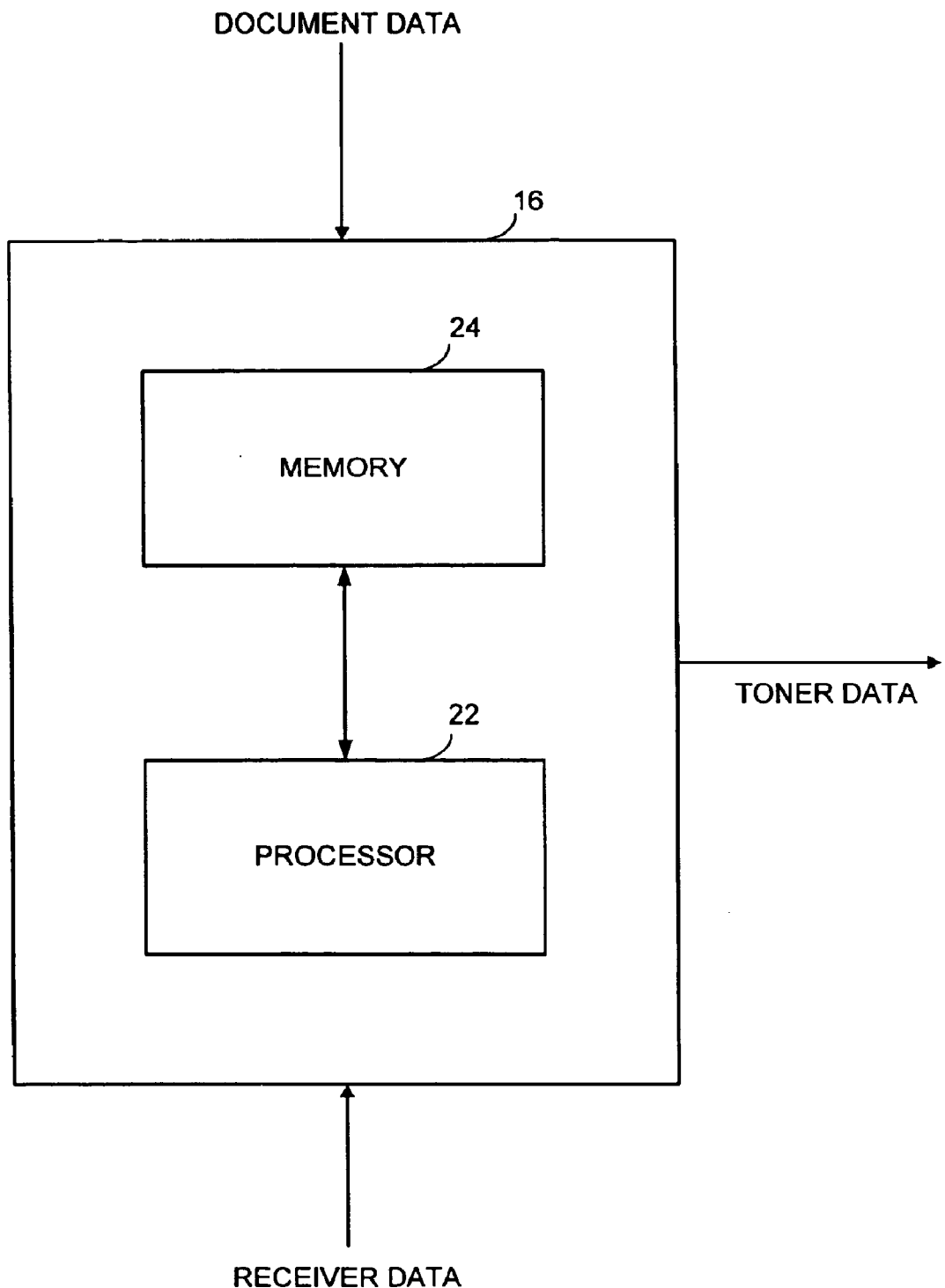
FIG. 2 is a block diagram of an image processor within the copying system of FIG. 1.

FIG. 2 is a block diagram of the image processor 16 showing the data inputs and output. The image processor includes a processor 22, memory 24, and firmware contained in the memory. The firmware includes software routines that work in accordance with the invention upon the document data and receiver data read from buffers 14 and 20, respectively. These software routines generate copy pigment data in the form of toner data that is sent to a printer engine 26 (FIG. 1), where it is used to select and apply toners to the scanner receiver to produce a copy of the document. The finished copy is then conveyed to the finished copy bin 28 for pick-up.

In the illustrative embodiment, a method for considering a receiver's characteristics in producing a copy of a document is embodied in a software routine stored In the memory 24 and executed by processor 22. Prior to execution of the software routine, a document to be copied is placed in the scanner 12 and scanned, producing the document data described above. Upon activation of the scanner 12 by a user, the system 10 responds by also scanning the next sheet of receiver feeder with the scanner 18, thereby producing the receiver data also described above. These data are now in their respective buffers 14 and 20. The spatial and color resolution of these scans can vary as desired. For the document, higher resolutions (I.e., 1600 by 1200 pixels, 24 bites per pixel) provide sharper images with more color depth. For the receiver, on the other hand, average characteristics such as overall color may be acceptable, requiring lower spatial and color resolutions. The buffers must therefore be large enough to store the highest resolution data desired.

Figure 3:
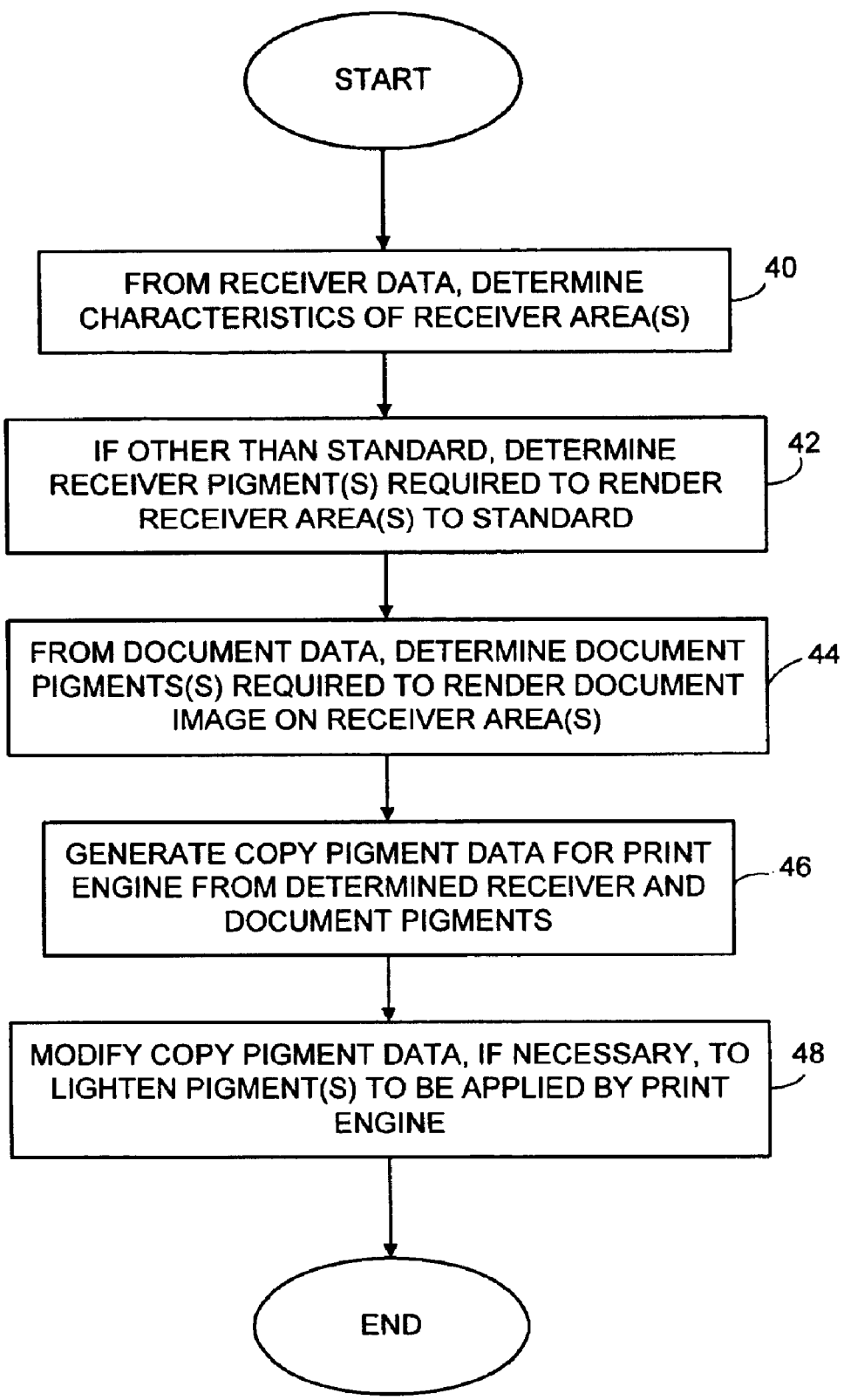
FIG. 3 is a flowchart of a method in accordance with invention for considering a receiver's characteristics in producing a copy of a document.

FIG. 3 is a flowchart of the method embodied in the software routine. The processor 16 proceeds by determining from the receiver data the characteristics of the receiver area(s) (40). This determination may be done at a number of resolutions, from one area (using average characteristics for the entire receiver) to multiple areas represented by pixels of various sizes (using specific characteristics for each pixel). If the characteristics are other than a given standard (such as the characteristics for white paper), then the routine determines which pigments and in what amount are required to render the receiver to that standard (42). In the illustrative embodiment pigments in toners for the subtractive colors cyan, magenta, and yellow are used. The cyan pigment absorbs (removes from white light) red light, the magenta pigment absorbs green light, and the yellow pigment absorbs blue light. Percentages of pigments in these subtractive colors can therefore be mixed to get the appearance of any desired color. Absence of any pigment leaves the light reflected from the receiver unchanged; adding 100% of all three pigments turns white to black. For example, if the receiver has a red tint to it, the routine determines that a low percentage of cyan pigment should be applied to absorb red. From the document data, the routine determines what pigments and in what amount are required to render the document on the receiver area (44). The routine then generates copy pigment data for the print engine 26 from the determined receiver and document pigments, such as by adding or otherwise combining the pigment data from these two sources (46). In some circumstances the copy pigment data at this point may produce a document copy that is too dark. To prevent this, the routine checks the pigment percentages and if they are greater than a threshold amount uniformly reduces them to lighten the copy (48). The modified copy pigment data is then transmitted to the print engine, which uses it to print a copy of the document on the receiver.

Although illustrated in a copying system, the invention can be practiced in other types of systems such as printers, fax machines, combined purpose machines, etc., and the term should be interpreted broadly enough to cover all such systems. In a printer, the document scanner 12 may not be used, the document data instead coming from an input device such as a computer or digital camera. Sensors other than scanner 18 may be used to collect information about the receiver's characteristics. It should also be recognized that a user may enter the characteristics of the receiver into the copying system such as through a menu, thus avoiding the need for scanning the receiver to obtain the characteristics. And while the method in the illustrative embodiment employs toners as the pigment carriers, inks and other pigment carriers may also be used in other systems such as inkjet printers where appropriate.

In view of the many possible embodiments to which the principles of the invention may be applied, it should be recognized that the embodiment is illustrative only. The invention, rather, includes all embodiments that come within the scope and spirit of the following claims and equivalents thereto.

What is claimed is:

1. A method of copying a document onto a receiver, the method comprising:

determining the characteristics of a receiver on which the document will be copied;

from the characteristics, determining which pigments are required to render the receiver to a given standard;

determining which pigments are required to render the document image on the receiver;

generating copy pigment data for a print engine from the determined receiver and document pigments, the print engine employing the copy pigment data to copy the document onto the receiver; and wherein the determining the characteristics of the receiver on which the document will be copied includes electronically scanning the receiver.

2. A method of copying a document onto a receiver, the method comprising:

electronically scanning a receiver;

determining from the scanned receiver the characteristics of the receiver on which the document will be copied;

from the characteristics, determining which pigments are required to render the receiver white;

electronically scanning a document;

determining from the scanned document which pigments are required to render the document image onto the receiver;

generating copy pigment data from the determined receiver and document pigments; and employing the copy pigment data to copy the document image onto the receiver.

3. A computer-readable storage medium on which is stored software for executing the method of claim 2.

4. A copying system comprising:

a buffer storing data describing a document to be copied;

a receiver scanner scanning receivers on which the document image is to be copied and producing therefrom characteristic receiver data;

an image processor receiving the document data and receiver data, the image processor generating therefrom copy pigment data comprising pigment data required to render the receiver to a standard; and a print engine receiving the generated copy pigment data and employing the data to copy the document onto the receiver.

5. The copying system of claim 4 including a scanner scanning documents to be copied and producing therefrom document data for the buffer.

* * * * *